US008145484B2

(12) United States Patent
Zweig

(10) Patent No.: US 8,145,484 B2
(45) Date of Patent: Mar. 27, 2012

(54) SPEECH PROCESSING WITH PREDICTIVE LANGUAGE MODELING

(75) Inventor: Geoffrey Zweig, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 12/268,447

(22) Filed: Nov. 11, 2008

(65) Prior Publication Data

US 2010/0121639 A1 May 13, 2010

(51) Int. Cl.
*G10L 15/00* (2006.01)
(52) U.S. Cl. ........ 704/240; 704/231; 704/239; 704/235; 704/243; 704/251
(58) Field of Classification Search .................. 704/231, 704/239, 235, 243, 251, 240, 270, 275
See application file for complete search history.

(56) References Cited

U.S. PATENT DOCUMENTS

| | | | | |
|---|---|---|---|---|
| 6,182,039 | B1* | 1/2001 | Rigazio et al. | 704/257 |
| 6,910,012 | B2* | 6/2005 | Hartley et al. | 704/243 |
| 7,003,456 | B2* | 2/2006 | Gillick et al. | 704/235 |
| 7,590,536 | B2* | 9/2009 | Bates et al. | 704/244 |
| 2004/0172258 | A1* | 9/2004 | Dominach et al. | 704/277 |
| 2004/0176114 | A1 | 9/2004 | Northcutt | |
| 2006/0173678 | A1* | 8/2006 | Gilbert et al. | 704/233 |
| 2007/0083374 | A1* | 4/2007 | Bates et al. | 704/257 |
| 2007/0100619 | A1 | 5/2007 | Purho | |
| 2007/0239637 | A1* | 10/2007 | Paek et al. | 706/20 |
| 2008/0077406 | A1 | 3/2008 | Ganong, II | |
| 2008/0120102 | A1 | 5/2008 | Rao | |
| 2009/0171662 | A1* | 7/2009 | Huang et al. | 704/251 |

OTHER PUBLICATIONS

Cox A, Walton A (2004) Evaluating the viability of speech recognition for mobile text entry. In: Proceedings of HCI 2004: design for life, pp. 25-28.*
"Quillsoft SpeakQ", Retrieved at <<http://www.studica.com/products/product_detail.cfm?productid=49518>>, Aug. 8, 2008, pp. 1-2.
Cox, et al. "Evaluating the Viability of Speech Recognition for Mobile Text Entry", Retrieved at <<http://citeseerx.ist.psu.edu/viewdoc/download;jsessionid=3080C8B030636621D3C6C0377AE69FC0?doi=10.1.1.98.9196&rep=rep1&type=pdf>>, pp. 4.
"Tegic Taps ScanSoft for Speech and Handwriting Input on Cell Phones and Smartphones", Retrieved at <<http://www.dragon-medical-transcription.com/dragon_naturally_speaking_reviews_2005_09.html>>, Aug. 8, 2008, pp. 1-4.
Whaley, David, "Better Ways of Typing Text Messages on your Hand-Held Device", Retrieved at <<http://www.touchbriefings.com/pdf/20/wire02_t_Motorlex.pdf>>, Businessbriefing: Wireless Technology 2003, pp. 1-3.
Blass, Evan, "XT9 Takes Predictive Text Entry to the Xtreme", Retrieved at <<http://www.engadgetmobile.com/2006/02/14/xt9-takes-predictive-text-entry-to-the-xtreme/>>, Feb. 14, 2008, pp. 1-3.
Kim, Gary, "Yahoo Enhances Search using Voice and Predictive Text", Retrieved at <<http://mobile-voip.tmcnet.com/topics/mobile-communications/articles/24426-yahoo-enhances-search-using-voice-predictive-text.htm>>, Apr. 3, 2008, pp. 1-4.
"Mobile Devices", Retrieved at <<http://www.nuance.com/mobiledevices/>>, Aug. 8, 2008, p. 1.

* cited by examiner

*Primary Examiner* — Richemond Dorvil
*Assistant Examiner* — Edgar Guerra-Erazo

(57) ABSTRACT

The described implementations relate to speech spelling by a user. One method identifies one or more symbols that may match a user utterance and displays an individual symbol for confirmation by the user.

20 Claims, 4 Drawing Sheets

SPEECH PROCESSING WITH PREDICTIVE LANGUAGE MODELING

BACKGROUND

Presently users of various computing devices can enter words as text through a keyboard of some type. Entering words on traditional computing devices that have a comfortable keyboard is relatively easy. However, many types of computing devices, such as cell phones, smart phones, and personal digital assistants (PDAs) have very limited keyboard space and/or employ only a few multifunction keys. Typing letters or symbols to generate a word or phrase on such devices leaves much to be desired. Another option is speech recognition where the user utters words which are processed into text words for the user. However, word-based speech recognition is very resource intensive and often requires significant training with an individual to achieve acceptable results. Neither of these options of user input has proven satisfactory in many scenarios, especially those scenarios that involve small devices with constrained keypads and/or constrained resources. The present concepts offer solutions for such scenarios.

SUMMARY

The described implementations relate to speech spelling by a user. One method identifies one or more symbols that may match a user utterance and displays an individual symbol for confirmation by the user. This process can be repeated to allow a user to spell out a desired word or phrase symbol by symbol. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

Figure 1:
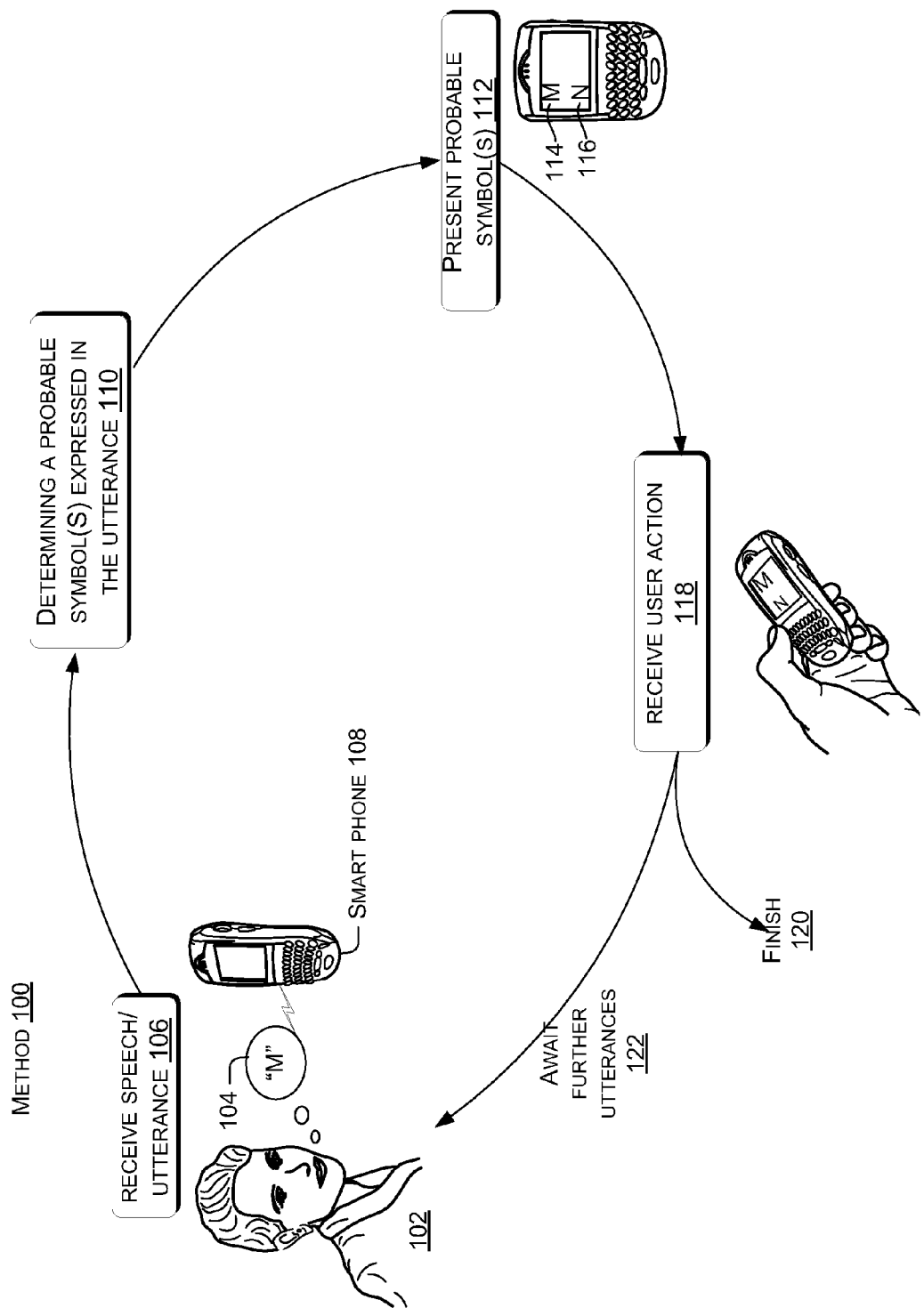
FIGS. 1-2 show exemplary methods for implementing predictive speech processing in accordance with some implementations of the present concepts.

This patent application pertains to predictive speech spelling. A user can utilize predictive speech spelling to spell out a word letter-by-letter. For example, the user may want to enter a business name so that his/her cell phone or other computing device can connect the user to the business. For introductory purposes consider the exemplary method 100 in FIG. 1 where a user 102 says or utters a symbol at 104. In this case, the uttered symbol (i.e., utterance) is the letter "m". The user's utterance is received at 106 by a microphone of a Smartphone 108. At 110 the process determines a probable symbol(s) expressed in the utterance. Stated another way, the process can determine a probable textual symbol that corresponds to the utterance. For instance, the process can determine the probable textual symbol utilizing dynamically updated speech recognition grammar. This aspect will be described in a second example below.

The probable symbol can be presented to the user at 112. In a scenario where a single probable symbol can be determined with a high degree of probability, then the single probable symbol can be presented to the user for verification. Otherwise, multiple probable symbols can be presented to the user. In this case, two symbols "m" and "n" are presented to the user at 114, 116 respectively. The two symbols "m" and "n" can be presented in a ranked manner that reflects their relative probabilities for matching the utterance. Techniques for determining the relative probabilities are discussed in more detail below. Here, the "m" is listed first at 114 with the "n" listed below to indicate that "m" is ranked higher than "n".

The method receives a user action at 118. For instance, the user can either, confirm the "m" symbol, scroll down and confirm the "n" symbol, or take other actions, such as repeating the utterance. The user can also be given the opportunity to indicate when the word is complete. In such a case, the process finishes at 120. Otherwise, the process can await further utterances at 122.

As introduced above, the present implementations can dynamically update speech recognition grammar as user entries are received. For instance, in a second example, assume that the process starts with a database of entries that includes the following entries:

---

. . .
ABC Café (requested 14 times)
Johnny's Bar (requested 5 times)
James Street Grill (requested 10 times)
Jacob's Corner (requested 2 times)
. . .

---

At each step, the process knows which letters the user has specified so far, and weights the grammar towards recognizing letters that are consistent with this choice. For example, based on the set above, if the user has confirmed "J A", the expected continuations are "M" with probability 10/12=0.833, and "C" with probability 2/12=0.167. The grammar that is used to recognize the next letter should reflect approximately these probabilities. However, to allow for unexpected input, the probabilities can be interpolated with a uniform distribution to give approximately:

---

. . .
$P(M) = 0.80$
$P(C) = 0.15$
$P(A) = (.833 + .167 - .8 - .15)/24 = 0.001875$
$P(B) = 0.001875$
. . .

---

In this configuration, some probabilities are higher than others based upon previous entries, but no symbol is given a probability of zero. In this way the process can be weighted toward previous entries and still accommodate new entries that have not been previously received. Accordingly, at each stage the process can estimate a maximum likelihood based language model over letters, based on the expected continuations. The process can then interpolate this with a uniform language model.

Figure 2:
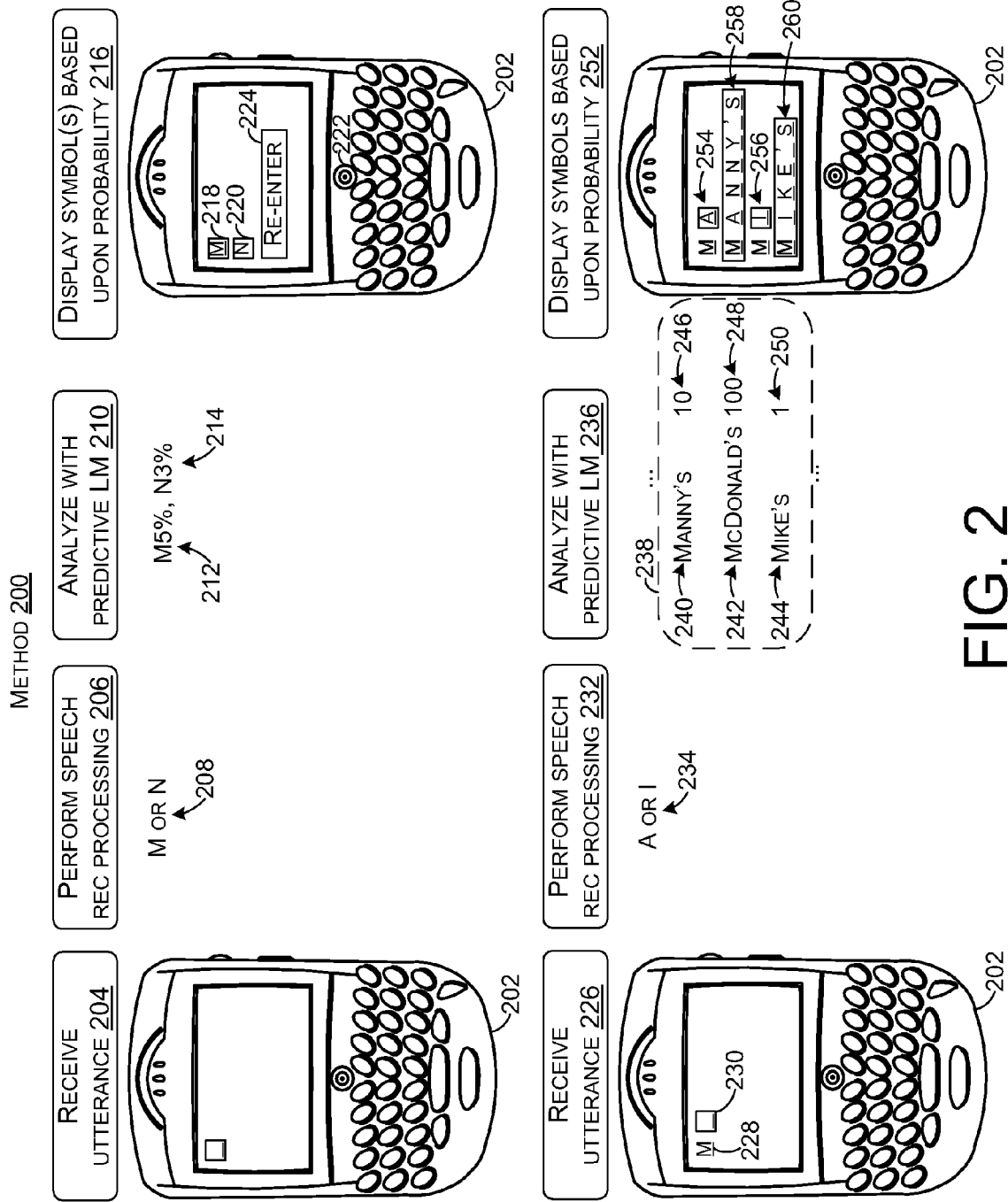

FIG. 2 shows another predictive speech spelling method 200. For purposes of explanation, the method is implemented on a Smartphone 202. The method can allow a user to enter a word(s) letter-by-letter. While letters are discussed in this example, the method can be used with other symbols besides letters, such as numerals, punctuation marks, etc.

The method begins by receiving a user utterance/speech at 204. Next, the method performs speech recognition processing at 206 to identify one or more symbols that may match the utterance. For discussion purposes, in this example assume that the speech recognition processing identifies two letters "m" and "n" as being potential matches as indicated at 208.

The method can analyze the potential matches 208 with predictive language modeling at 210. Briefly, predictive language modeling can utilize a dataset of entries, such as words, phrases, addresses, etc. Often, the dataset can include hundreds, thousands, or even millions of different entries. Further, the dataset can list a number of times that a given entry was made.

For sake of brevity, FIG. 2 utilizes a dataset with only a few entries, but the same principles apply to larger datasets. Assume that in this example, of all entries in the dataset, 5% start with the letter "m" as indicated at 212 and 3% start with the letter "n" as indicated at 214. Accordingly, predictive language modeling analyzes the potential matches 208 and determines that "m" is the more likely or more probable match to the utterance than "n" based upon the dataset.

At 216 the method displays the potential matches based upon probabilities (i.e., in a ranked manner). In this implementation, the letter "m" is presented first at 218 to indicate that it is the most likely match. The letter "n" is presented beneath the "m" at 220 to indicate that it is a less likely match. This configuration can offer convenience to the user in that the most likely match can be confirmed or selected by a single user action such as by clicking on the "m", such as via controller 222. If the process has misidentified the utterance the user can scroll down and select the "n" at 220.

If both the presented symbols (i.e., "m" and "n") are incorrect, the user can simply not select either presented symbol and repeat the utterance or scroll down to, and select, a "re-enter" option 224. Once the user selects "re-enter" the method awaits the user's utterance. For discussion purposes, assume that the user confirms that the "m" presented at 218 matches the utterance received at 204.

The method then awaits the receipt of a further utterance at 226. In this implementation, Smartphone 202 now displays the confirmed letter "m" at 228. Further, the Smartphone indicates at 230 that it is awaiting the next utterance. When the next utterance is received speech recognition processing is performed at 232. In this case, the speech recognition processing indicates that the utterance is either an "a" or an "i" as indicated at 234. Remember that the user has already confirmed that the first letter is "m" and now the method indicates that the second letter is either "a" or "i".

The method then analyzes the speech recognition processing output 234 with predictive language modeling at 236. Listings from the predictive language modeling dataset relating to words beginning with the letter "m" are indicated generally at 238. As mentioned above, the number of entries in the dataset is purposely small for sake of brevity. In this case, there are three entries that begin with the letter "m". The first entry is "Manny's" as indicated at 240. The second entry is "McDonald's" as indicated at 242. The third entry is "Mike's" as indicated at 244. Further, the entry "Manny's was entered 10 times as indicated at 246. The entry "McDonald's" was entered 100 times as indicated at 248. The entry "Mike's" was entered 1 time as indicated at 250. So in this case, based upon the speech recognition processing, and the entries in the data set, the word that the user is spelling can be an "m" followed by an "a" or an "i".

The predictive language modeling dataset contains an entry consistent with each of these possibilities. So, "m" followed by "a" is consistent with the entry "Manny's" and "m" followed by "i" is consistent with the entry "Mike's". However, based upon the frequency of previous entries, the probability that the user's second letter is "a" is 10/11 while the probability that the second letter is "i" is 1/11. Stated another way, the dataset includes 11 entries that start with either "ma" or "mi". Ten of the 11 entries are "ma" while only one is "mi". Thus, predictive language modeling can rank the relative probability that the symbol corresponding to the user's second utterance is "a" higher than the relative probability that it is "i". Accordingly, predictive language modeling can be termed "predictive" in that it can predict or rank, by relative probabilities, the symbols obtained from the speech recognition processing that match the utterance.

Further, in this case, the dataset includes only one entry that begins with "ma" (i.e., "Manny's" and only one entry that begins with "mi" (i.e., "Mike's"). Accordingly, predictive language modeling can be termed "predictive" it that it can predict that one of these words is the word that the user is spelling.

The method displays the potential symbols based on probability at 252. In this case, predictive language modeling determined that the second user utterance was more likely "a" than "i" so "ma" is presented first at 254, with "mi" presented below at 256. Further, in this case, since only one entry (i.e., "Manny's") in the dataset begins with "ma" this entry is also presented to the user at 258. Similarly, only one entry (i.e., "Mike's") in the dataset begins with "mi" this entry is also presented to the user at 260. Thus, if the word the user is spelling is "Manny's" or "Mike's" then the user can simply select the corresponding entry 258 or 260. If the user is spelling a different word, he/she can select the appropriate second letter (i.e., "a" or "i") and continue the process with the next utterance. If the method misinterpreted the utterance then the user can repeat the utterance or take other action.

Exemplary Operating Environments

Figure 3:
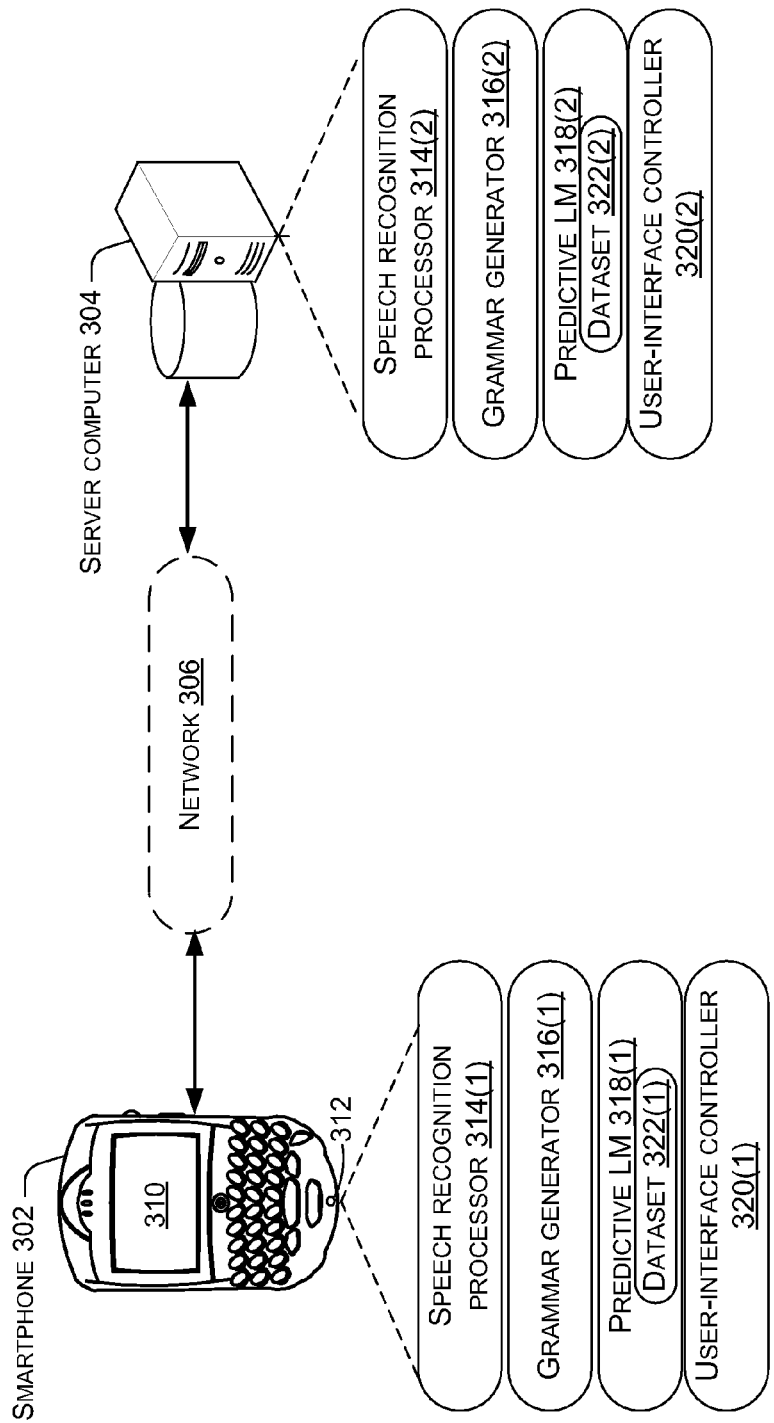
FIG. 3 illustrates exemplary predictive speech processing systems in accordance with some implementations of the present concepts.

FIG. 3 shows an exemplary operating environment 300 in which predictive speech spelling concepts described above and below can be implemented on various computing devices. Briefly, the present concepts can be implemented with any computing device that can receive audio input from a user and has a user-interface. Further, the present implementations can be employed in a stand-alone configuration and/or a server/client distributed configuration.

In the illustrated case, the computing devices are manifested as a smart phone 302 and a server computer 304. The computing devices 302-304 can be communicably coupled with one another via a network 306.

Smart phone 302 can be representative of any number of ever evolving classes of computing devices that can offer one or more of the following: cellular service, internet service, and some processing capabilities combined with a user-interface. Other current examples of this class can include personal digital assistants and cell phones, among others.

The present concepts can be employed with computing devices having various capabilities. For instance, the present concepts can be employed on a freestanding computing device where applications are run locally on the computing device to perform the predictive speech spelling functionality.

In this implementation, smart phone 302 includes user-interface means in the form of display 310, a microphone 312, a speech recognition processor 314(1), a grammar generator 316(1), a predictive language model 318(1), and a user-interface controller 320(1). Further, the predictive language model 318(1) can be trained with a dataset 322(1).

The speech recognition processor 314(1) can process user utterances to determine potential corresponding text symbols. In the present implementation, the speech recognition module is generally configured to recognize a relatively small number of symbols. For instance, in an English-language configuration, the speech recognition processor 314(1) may recognize the 26 letters of the alphabet (i.e., a-z), the ten numerals (i.e., 0-9) and other miscellaneous symbols, such as "#" "@", etc. In many configurations, the total number of symbols that the speech recognition processor 314(1) is configured to recognize can be less than 100. Accordingly, the processing and/or memory resources required for the speech recognition module can be relatively modest and can easily be accommodated by existing cell phone/Smartphone/PDA technologies.

The grammar generator 316(1) can operate cooperatively with the speech recognition processor 314(1) in order to conserve processing resources. For instance, the grammar generator can limit the number of symbols with which the speech recognition processor 314(1) compares a given utterance. For instance, consider a scenario where the user confirms that the first utterance was a "q". From dataset 322(1), the grammar generator can determine that in no previous user entry did a letter other than "u" follow a "q". Accordingly, the grammar generator 316(1) can indicate that the speech recognition processor 314(1) need only compare the next utterance to the letter "u" and other non-letter symbols. Stated another way, the grammar generator may indicate to the speech recognition processor to only compare the next utterance to a sub-set of symbols that includes the letter "u" and not any other alphabetic symbols. Thus, processing resources can be conserved that may otherwise have been needlessly wasted trying to determine if the next utterance matched the remaining 25 letters of the alphabet.

The predictive language model 318(1) can be trained with dataset 322(1). In some implementations, dataset 322(1) can be statically installed on smart phone 302 during manufacture. In other implementations, the dataset 322(1) can be updated during a life of the smart phone 302. Dataset 322(1) can be generated in several ways. One suitable way can be to obtain a pre-existing dataset of previous user entries. For instance, datasets have been compiled when users of smart phones and/or other computing devices enter search queries or entries such as via text or orally. In some cases, the entry that was responsively generated is presented back to the user for verification. A large dataset compiled in this manner is very likely to capture a word or phrase that a user of Smartphone 302 intends to enter. Accordingly, the predictive language model can predict, based on probabilities, what symbols the user is uttering into smart phone 302.

User-interface controller 320(1) can control display 310 to present the potential symbols in a ranked order based upon the probabilities determined by the predictive language model 318(1). For instance, in one implementation illustrated in FIG. 2, the ranking was conveyed by presenting the symbol with the highest probability at the top of the listing and lesser probability symbols listed in descending order below.

As mentioned above, in some implementations, speech recognition processor 314(1), grammar generator 316(1), and predictive language model 318(1) can all be implemented on smart phone 302 in a stand-alone configuration to accomplish predictive speech spelling. For instance, the user may want to find a phone number for a business and may begin to spell out the business name symbol by symbol. In this implementation, eventually the business name can be presented to the user for confirmation. In this case, 'stand-alone' means that all processing up to this point can be accomplished on the Smartphone 302. Upon user confirmation of the business name, the Smartphone 302 can communicate with server computer 304 to obtain the corresponding business information, such as telephone number and/or address and/or to automatically dial the business for the user. A stand-alone configuration can be potentially advantageous in that it can reduce or eliminate communication latency over network 306 during the predictive speech spelling process.

Other implementations can be distributed in nature where some or all of the processing can be achieved on the server computer 304. For instance, one or more of the described components can be implemented on the server computer. For example, such a configuration can be evidenced by speech recognition processor 314(2), grammar generator 316(2), predictive language model 318(2), user-interface controller 320(2) and dataset 322(2) implemented on server computer 304. Data can be communicated back and forth between the smart phone and the server computer during the predictive speech spelling process so that ultimately, the results are presented to the user on the smart phone's display 310.

Exemplary Methods

Figure 4:
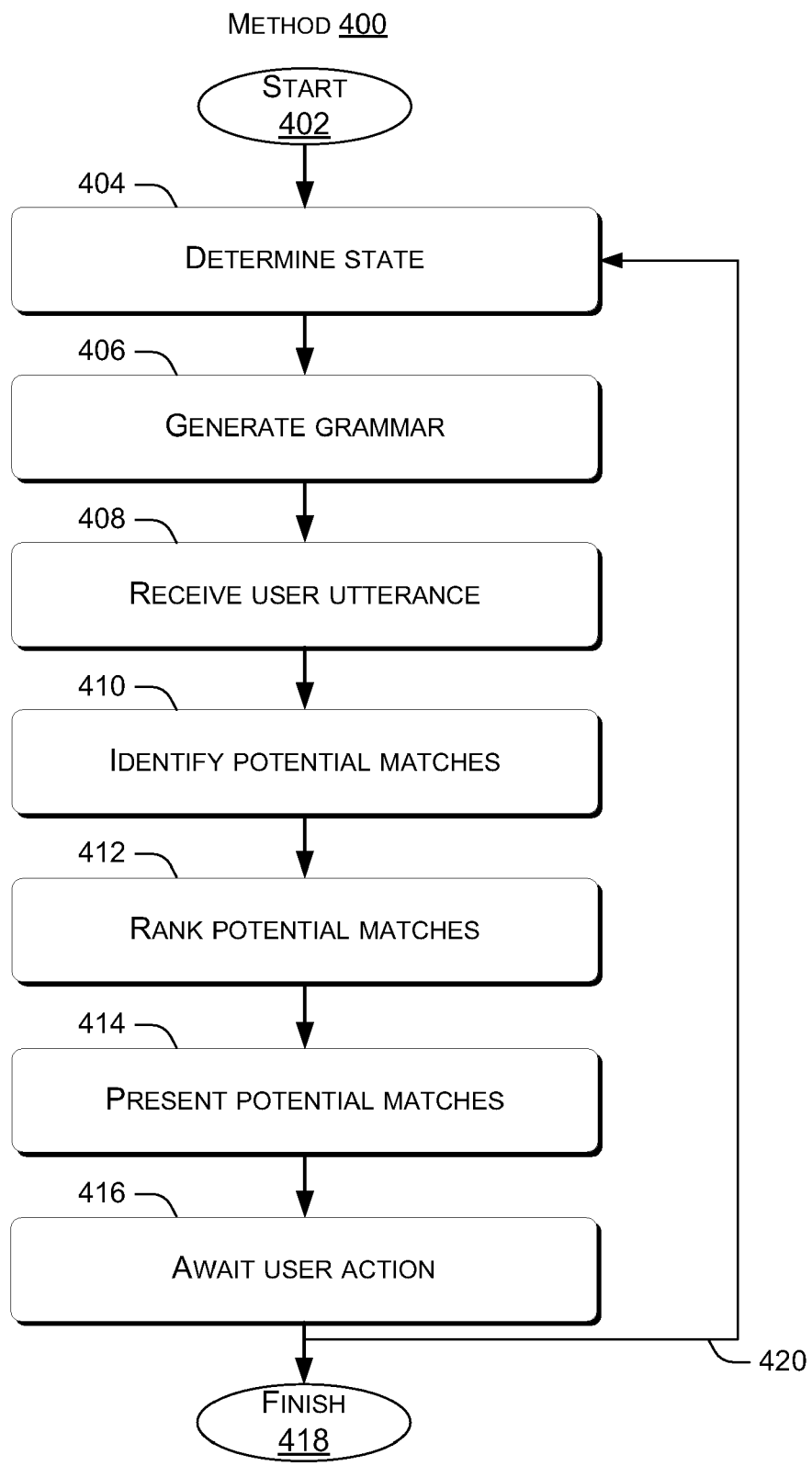
FIG. 4 is a flowchart of exemplary predictive speech processing methods in accordance with some implementations of the present concepts.

FIG. 4 illustrates a flowchart of a method or technique 400 that is consistent with at least some implementations of the present concepts. The order in which the method 400 is described is not intended to be construed as a limitation, and any number of the described blocks can be combined in any order to implement the method, or an alternate method. Furthermore, the method can be implemented in any suitable hardware, software, firmware, or combination thereof such that a computing device can implement the method. In one case, the method is stored on a computer-readable storage media as a set of instructions such that execution by a computing device causes the computing device to perform the method.

The method starts at 402, such as when a user invokes a predictive speech spelling query mode.

The method determines a state at 404. Here, "state" can refer to whether the user has already confirmed one or more symbols. For purposes of explanation assume that the method is reaching block 404 right after starting, so the user has not made any utterances at this point.

The method generates grammar at block 406. Grammar generation can serve to define what symbols the next user utterance can be evaluated against. So, given a set of symbols, grammar generation determines which sub-set of those symbols should be evaluated against the next utterance.

The grammar generation can be accomplished based upon the state and information from a predictive language model (and/or its dataset). For instance, assume that the dataset indicates that all user entries either started with a letter or a numeral and not a "#" sign or other symbol. In that case, the grammar generation can define the sub-set as all letters and all numerals. In another example described above, the state was that the user had confirmed a first utterance as "q". In that case, the state is that "q" was the first symbol and that the method was awaiting the second symbol. In that example, the grammar generation generated a sub-set that excluded all letters except "u" based upon entries in the dataset.

The method receives a user utterance at 408. The method can identify potential matches for the utterance at 410. For instance, the utterance can be evaluated utilizing speech recognition against a sub-set of symbols defined by the grammar generation described at block 406. This configuration can reduce processing resources when compared to evaluating the utterance against the set of all symbols. The method can identify one or more potential matches for the utterance.

The method can rank the potential matches at 412. For instance, the method can analyze the potential matches utilizing language modeling. The language modeling can leverage previous user entries to determine a relative likelihood of individual potential matches. For instance, continuing with the above example where the utterance is the first utterance of a query, language modeling can establish probabilities for each of the potential matches. For example, assume there are three potential matches "b", "e", and "g" and that the language model indicates that 2% of all user entries started with "b", 1% with "e" and 3% with "g". Then language modeling can establish the relative rankings for a match as "g", "b" and then "e".

The method presents the potential matches at 414. The potential matches can be presented in a manner that conveys their rank. For instance, the potential matches can be displayed in descending order or with highlights or other means for indicating relative rank.

The method awaits user action at block 416. For instance, the user may select one of the presented potential matches or repeat the utterance. If the user has uttered the last symbol of the query then the process finishes at 418. Otherwise, as indicated at 420, the process can return to block 404 to re-determine the state based upon the user confirmed symbol or to repeat the utterance. The process can then be repeated until the user completes the query word or phrase.

CONCLUSION

Although techniques, methods, devices, systems, etc., pertaining to predictive speech spelling scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
a speech recognition processor configured to:
    receive a user utterance from a user; and
    identify potential matching symbols for the user utterance;
a predictive language model configured to:
    weight a grammar with relative probabilities of the potential matching symbols using a dataset, the dataset comprising:
        confirmed user entries comprising words or phrases that were previously entered by the user and confirmed by the user; and
        a number of occurrences of the confirmed user entries in the dataset,
    wherein the predictive language model is configured to weight the grammar with the relative probabilities of the potential matching symbols based upon the number of occurrences of the confirmed user entries in the dataset;
a user-interface controller configured to cause the potential matching symbols to be presented to the user in a ranked order based upon the relative probabilities; and
at least one computing device configured to execute one or more of the speech recognition processor, the predictive language model, or the user-interface controller.

2. The system of claim 1, wherein the predictive language model is further configured to predict a word that the user is spelling with the user utterance based upon the dataset.

3. The system of claim 1, further comprising a grammar generator configured to define the grammar, the grammar comprising a sub-set of symbols for use by the speech recognition processor.

4. The system of claim 3, wherein the grammar generator is configured to define the sub-set based upon the dataset of confirmed user entries.

5. The system of claim 1, wherein the predictive language model is configured to weight the grammar such that probabilities of individual potential matching symbols that are included in relatively more occurrences in the dataset are higher than probabilities of other individual potential matching symbols that are included in relatively fewer occurrences in the dataset.

6. The system of claim 5, wherein the predictive language model is further configured to update the grammar as further user entries are received.

7. A method, comprising:
receiving a user utterance from a user using a computing device;
identifying potential matching symbols for the user utterance;
ranking, using a predictive language model, the potential matching symbols by relative probabilities of the potential matching symbols, wherein the relative probabilities are determined by the predictive language model using a dataset, the dataset comprising:
    confirmed user entries comprising words or phrases that were previously entered by the user into the computing device and confirmed by the user, and
    a number of occurrences of the confirmed user entries in the dataset; and
causing the potential matching symbols to be presented to the user on the computing device in a ranked order based upon the probabilities of the potential matching symbols,
wherein the relative probabilities of the potential matching symbols are weighted based upon the number of occurrences of the confirmed user entries in the dataset.

8. The method of claim 7, further comprising:
predicting a word that the user is spelling with the user utterance based upon the dataset.

9. The method of claim 7, further comprising:
defining a grammar, wherein the grammar comprises a sub-set of symbols for use in identifying the potential matching symbols.

10. The method of claim 9, wherein the sub-set is defined based upon the dataset of confirmed user entries.

11. The method of claim 7, wherein probabilities of individual potential matching symbols that are included in relatively more occurrences in the dataset are weighted higher than probabilities of other individual potential matching symbols that are included in relatively fewer occurrences in the dataset.

12. The method according to claim 11, further comprising:
updating the relative probabilities after further user entries are received.

13. The method according to claim 7, wherein the ranked order comprises a descending order based on the relative probabilities of the potential matching symbols.

14. The method according to claim 7, wherein:
the user utterance is part of a word or phrase being currently entered by the user to the computing device, and
the potential matching symbols are symbols that appear after other symbols that are included in both the word or phrase being currently entered by the user and in individual confirmed user entries that are used to rank the potential matching symbols.

15. A hardware computer-readable storage media having instructions stored thereon that when executed by a computing device cause the computing device to perform acts, the acts comprising:
receiving a user utterance from a user;
identifying potential matching symbols for the user utterance;
ranking, using a predictive language model, the potential matching symbols by relative probabilities of the potential matching symbols, wherein the relative probabilities are determined by the predictive language model using a dataset, the dataset comprising:
confirmed user entries comprising words or phrases that were previously entered by the user and confirmed by the user; and
a number of occurrences of the confirmed user entries in the dataset; and
presenting the potential matching symbols in a ranked order based upon the relative probabilities of the potential matching symbols, wherein the relative probabilities of the potential matching symbols are weighted based upon the number of occurrences of the confirmed user entries in the dataset.

16. The hardware computer-readable storage media of claim 15, the acts further comprising:
predicting a word that the user is spelling with the user utterance based upon the dataset.

17. The hardware computer-readable storage media of claim 15, the acts further comprising:
defining a grammar, wherein the grammar comprises a sub-set of symbols used to identify the potential matching symbols.

18. The hardware computer-readable storage media of claim 17, wherein the sub-set is defined based upon the dataset of confirmed user entries.

19. The hardware computer-readable storage media of claim 15, wherein probabilities of individual potential matching symbols that are included in relatively more occurrences in the dataset are weighted higher than probabilities of other individual potential matching symbols that are included in relatively fewer occurrences in the dataset.

20. The hardware computer-readable storage media according to claim 19, the acts further comprising:
updating the relative probabilities after further user entries are received.

* * * * *